United States Patent
Tiruvallur

(10) Patent No.: US 9,854,932 B2
(45) Date of Patent: Jan. 2, 2018

(54) PRESSURE COOKER

(71) Applicant: TTK Prestige Limited, Bangalore (IN)

(72) Inventor: Thatai Jagannathan Tiruvallur, Bangalore (IN)

(73) Assignee: TTK Prestige Limited (IN)

( * ) Notice: Subject to any disclaimer, the term of this patent is extended or adjusted under 35 U.S.C. 154(b) by 169 days.

(21) Appl. No.: 14/770,387

(22) PCT Filed: Jan. 3, 2014

(86) PCT No.: PCT/IN2014/000008
§ 371 (c)(1),
(2) Date: Aug. 25, 2015

(87) PCT Pub. No.: WO2015/037012
PCT Pub. Date: Mar. 19, 2015

(65) Prior Publication Data
US 2016/0007789 A1 Jan. 14, 2016

(30) Foreign Application Priority Data
Sep. 10, 2013 (IN) .......................... 4035/CHE/2013

(51) Int. Cl.
*A47J 27/09* (2006.01)
(52) U.S. Cl.
CPC .................................... *A47J 27/09* (2013.01)
(58) Field of Classification Search
CPC ..................................................... A47J 27/09
USPC ................ 99/292, 295, 330, 337, 342, 403; 220/203.05, 240, 316, 573.4
See application file for complete search history.

(56) References Cited

U.S. PATENT DOCUMENTS

| 2,538,583 | A | * | 1/1951 | Morrison, Jr. | ........ | A47J 27/092 |
| | | | | | | 116/100 |
| 2,577,985 | A | * | 12/1951 | Willman | ............... | A47J 31/043 |
| | | | | | | 99/281 |
| 4,853,509 | A | | 8/1989 | Murakami | | |
| 4,932,550 | A | | 6/1990 | Moucha | | |
| 5,229,563 | A | | 7/1993 | Isogai et al. | | |
| 5,310,981 | A | | 5/1994 | Sarnoff et al. | | |
| 5,317,959 | A | | 6/1994 | Beluzzi | | |

(Continued)

FOREIGN PATENT DOCUMENTS

DE          3223142 A1    12/1983

OTHER PUBLICATIONS

International Search Report for Application No. PCT/IN2014/000008 dated May 27, 2014.

*Primary Examiner* — Thien S Tran
(74) *Attorney, Agent, or Firm* — Lerner, David, Littenberg, Krumholz & Mentlik, LLP

(57) ABSTRACT

This invention relates to a safety locking means, particularly Multi functions Safety Lock means for a pressure cooker acting as a pressure indicator cam locking means comprising of a rod (1) as visual pressure indicator and a washer (4) suitably and removably fixed to avoid erroneous opening and closing of the pressure cooker thereby ensuring safe operation by the rod positioning above the lock cover (3) under pressure where restricts opening of the pressure cooker otherwise enables the pressure cooker to be opened when not in pressure. This locking means can be used on any type of pressure cooker including microwave pressure cooker.

8 Claims, 2 Drawing Sheets

(56) References Cited

U.S. PATENT DOCUMENTS

| | | | | |
|---|---|---|---|---|
| 5,701,805 | A * | 12/1997 | Sa | A47J 27/092 |
| | | | | 219/435 |
| 6,067,896 | A * | 5/2000 | Elorza | A47J 27/0813 |
| | | | | 220/293 |
| 6,135,013 | A * | 10/2000 | Barrena | A47J 27/092 |
| | | | | 220/203.01 |
| 6,283,014 | B1 * | 9/2001 | Ng | A47J 27/086 |
| | | | | 219/431 |
| 6,648,162 | B1 * | 11/2003 | Wooderson | A47J 27/0813 |
| | | | | 220/203.27 |
| 8,247,751 | B2 | 8/2012 | Jagannathan | |
| 8,393,262 | B1 * | 3/2013 | Molayem | A47J 27/092 |
| | | | | 219/440 |
| 2008/0290092 | A1 * | 11/2008 | de Bastos Reis Portugal | |
| | | | | A47J 27/0813 |
| | | | | 220/321 |

\* cited by examiner

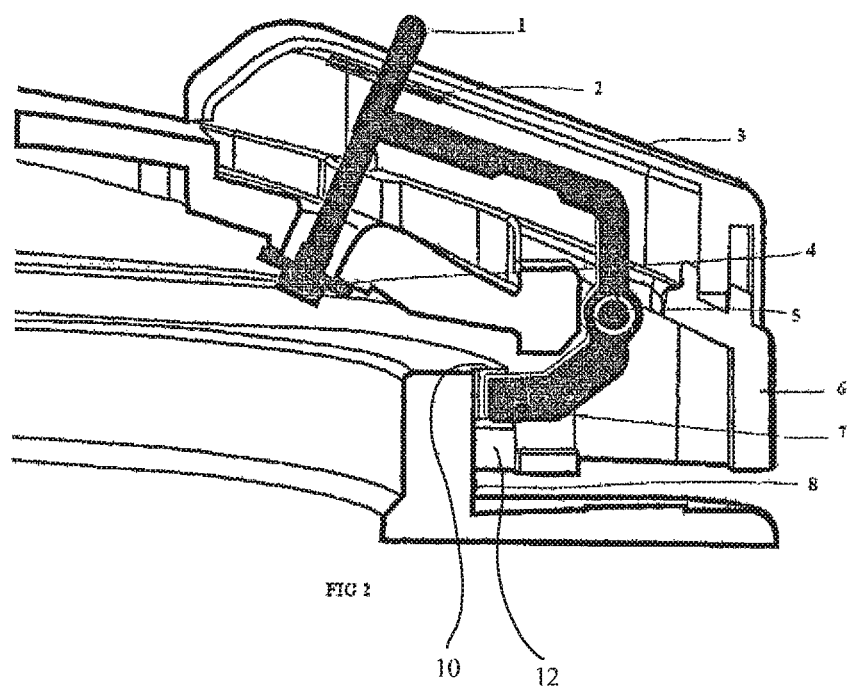

PRESSURE COOKER

FIELD OF INVENTION

The present invention in general relates to the microwave compatible cooking system to be used as home appliance for cooking foods and it more specifically relates to pressure cooking system to be used inside a microwave oven for cooking food containing steam at a pressure above the ambient pressure. The microwave pressure cooker described in this invention can be used to cook foods safely in various situations for domestic pressure cooking. This is a complete self contained system that can be used with any microwave oven provided with a chamber large enough to accommodate it and more specifically which has a safety lock means to manage safely pre-operation, during operation and post operation condition of the cooker.

BACKGROUND OF THE INVENTION

Microwave ovens use microwave energy to heat or cook food in a fraction of the time needed to cook with conventional ovens. Unlike conventional ovens, a microwave oven heats food without applying the external heat i.e. any flame or direct heat sources. The microwaves readily pass through many materials, such as glass, most plastics, paper and china clay, with little or no effect. Generally, these materials are used for making utensils which can be used for cooking in a microwave oven.

Nowadays the use of number of microwave oven in public has grown at very high rate. There has been an increase in demand for specially designed and configured cooking vessels for use in microwave ovens to provide easy and convenient way of preparing foods in microwave ovens. Many attempts have been made in the manufacture of various types of cooking vessels, casserole dishes, various types of bowls, pressure cookers for microwave and the like, to be compatible with use in microwave ovens.

PRIOR ART

U.S. Pat. No. 4,796,776 discloses a pressure cooker for use in microwave ovens includes a microwave permeable bowl-shaped container, a microwave permeable dome cover, and a steel locking ring permanently attached to the cover for maintaining the container and cover in fluid-tight seal during use. A safety valve, formed of flexible tubing, encounters a projection of the container and is deformed into a closed configuration responsive to movement of the cover, relative to the container, toward a locking position. A pressure regulator valve, consisting of a metal core surrounded by an elastically deformable casing, which is positioned over a pressure control opening in the cover to maintain a selected operating pressure level in the pressure cooker.

U.S. Pat. No. 4,853,509 discloses a rice cooker for preparation of shaped foods of rice in a microwave range is made of microwave permeable synthetic resin such as polypropylene and internally provided with mutually separate confined spaces of a fixed capacity and adapted for accommodating rice with water. As the rice cooker containing uncooked rice with water is heated in the microwave range, compression acts on the boiled rice due to pressure contact of the boiled rice swelled and water with walls defining the spaces and the boiled water is automatically shaped in the spaces. Absence of direct contact of the rice with user's hand during the process enables preparation of shaped foods of rice such as rice balls without any keen pain and blemish on the hands.

U.S. Pat. No. 5,229,563 discloses a pressure cooker and a process for making the same, wherein the pressure cooker includes a pressure container for accommodating food to be cooked, a cover for covering the container in an air-tight manner, a pressure control device for adjusting the internal pressure in the container. The container or the cover or both are partly or wholly made of a composite resin consisting essentially of polyphenylene sulfide resin and 30 wt. % to 50 wt. % glass fiber.

U.S. Pat. No. 5,310,981 discloses a microwave cooker capable of cooking an assortment of foods by a variety of methods while maintaining constant pressure. This pressure cooker boils and steams foods continuously without pressure build up and without the need to shut off the microwave oven. Food spattering and spillage are prevented by a unique internal baffle rib design and a mechanism that releasably locks the top cover. The top cover and inner cover of the pressure cooker have the same outer diameter and each have a plurality of vent holes or apertures. Both the top cover and inner cover are positioned within container and each have a skirted edge. The skirted edges form an enclosure within the container member, specifically designed to obstruct and contain escaping food particles.

Application no. 46/CHE/2010 of the applicant itself provides a unique pressure microwave cooker but with a lock means which is different from the existing invention.

DISADVANTAGES OF RELATED ART

In many of the prior art, the pressure cookers comprising container and cover that have been constructed to allow operation of cooker i.e. attempting to cook without built in features for confirming to the user himself that the closing the cooker cover over the body of the cooker is proper and complete. Similarly in the prior art, the pressure cookers do not provide for built in features on the cooker for confirming to the user himself the suitability of or attempting to open when there is a pressure buildup inside etc. Further many attempts have been made in prior art to achieve an efficient pressure cooking system, but still all suffer from drawbacks of not achieving a very safe operating system, as the focus is generally on the efficiency in cooking or on fuel saving or on cooking time.

Further most of the cookers do not give attention to the issue of actually controlling the opening and closing of such cookers in a very reliably and very safe manner.

OBJECT OF THE INVENTION

The primary object of the present invention is to provide a most reliable and safer lock system pressure cooker, comprising of sub-assemblies, all of which are designed to be compatible with corresponding energy and provided with all required safety features for cooking taking into account many typical mistakes that may be made by an user during using the cooker.

Further, the object of the invention is to provide pressure cooker mounted with safety locking devices prescribed in appropriate standards and having a fool proof locking means, thus eliminating the mistakes that may be made by an user during using the cooker.

It is another object of the invention to provide a lock means for the cooker which shall prevent erroneous closing and/or opening of the cooker thereby ensuring safe operation condition at all times.

It is another object of the invention to provide a simple, attractive and light weight pressure cooker in which all parts and subassemblies may be made up of materials that is compatible with microwave oven including the referred lock means.

It is another object of the invention to provide a simple, attractive and light weight pressure cooker in which all parts and subassemblies may be made up of either above referred lock or metal that is compatible with the corresponding used oven including the referred lock means. Both plastic and metal can be used for metal cookers.

It is another object of the invention to provide a pressure cooker with an improved pressure responsive locking device made of elastomeric material or of any suitable metallic material. It is attempted herein to provide a pressure cooker with an improved composite visual pressure indicating cum lock device made of corresponding material including the use of elastomeric material or metal or combination thereof for indicating the pressure that is developed inside the cooker. Yet another feature in the present invention is that it is provided with a specially designed visual pressure indicator cum lock means which is essentially capable of ensuring that when the cooker is under pressure the cover removal is not operable by user and further also ensures proper closure of the cooker prior to commencing the pressure buildup inside the cooker and additionally performs as a visual pressure indicator.

It is further object of the invention to provide an effective, easy and composite means of pressure indicator cum lock for pressure cooker.

It is further object of the invention to provide an effective, easy and composite means of releasing the pressure quickly, if so desired by the user by pushing down the visual pressure indicator.

This cooking system more specifically the lock means may be absolutely metal free and made of filled or unfilled polypropylene, delrin, polycarbonate or any polymer compatible with microwave energy at a working temperature of 100-125° C. including the lock device.

However use of metal is also possible as long as the material meets the working condition demanded by the cooking system. The material so used does not restrict the performance of the lock means.

SUMMARY OF THE INVENTION

According to the present invention, the pressure cooker may be a conventional pressure cooker or a microwave pressure cooker. If it is microwave pressure cooker then it needs to be made-up of microwave compatible material like polypropylene with the use of silicone for sealing and safety devices and otherwise, the same or a metallic lock means may be designed.

In this present invention, the pressure cooker works on the principle of normal pressure cooking like in a conventional cooker used on a gas stove, induction, microwave oven etc. so that the cooking time is less compared to time taken by any non pressure cooking.

According to the present invention, the pressure cooker has specially designed lock device. This may be made with metal or microwave compatible materials as detailed above.

BRIEF DESCRIPTION OF DRAWINGS

Figure 1:
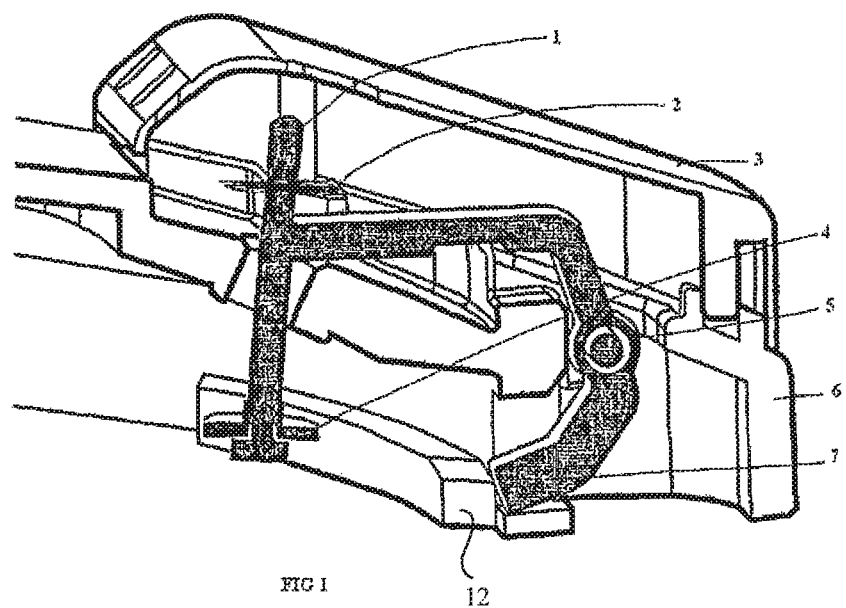

| SL NO | PART NAME | PART NO |
|---|---|---|
| 1 | Visual pressure indicator (rod) | 1 |
| 2 | Disc | 2 |
| 3 | Safety lock cover | 3 |
| 4 | Washer | 4 |
| 5 | Locking pin | 5 |
| 6 | Cover of cooker | 6 |
| 7 | Lock | 7 |
| 8 | Container | 8 |
| 9 | Locking Lug of Cover | 10 |
| 10 | Locking Lug of Container | 12 |

The Multifunction Safety Lock (MFSL) in FIG. 2 shows the position of locking lever when the cooker is under pressure. Under pressure the visual pressure indicator (rod) is extended above the top surface of the safety lock cover. The lock position of the lock means in the extended state will not allow the cooker to be opened until the visual pressure indicator drops.

The Multifunction Safety Lock in FIG. 1 shows the position of lock means, when the cooker is not under pressure. The visual pressure indicator (rod) is down and the lock position of the lock means in the retract state allows the cooker to be opened.

Safety lock cover means cover in the multifunction safety lock, which can be removed to clean. The cover needs to be replaced after cleaning. The cover needs to be in place when cooker is used for cooking. Cooking without the cover can scald the finger when the user attempts to press the visual pressure indicator (the rod) to release the pressure.

The invention in one aspect discloses a Multifunction Safety lock means which is a pressure indicator cum lock for a pressure cooker. The Multifunction Safety lock means is a pressure response type body. It has a pressure monitoring means comprising of a moving rod between a first state and second state. A silicone sealing washer is mounted on the rod. The rod along with this washer combinedly is mounted freely across a hole formed on the cover of the cooker with the washer positioned underneath the cover. This rod and washer move upward under increasing pressure to lift the rod from the first state and the washer towards the underside of the cover thereby pushing sealingly the circular washer until positioned against the underside of the cover to seal the said hole and simultaneously the rod also extending upwardly above the top surface of the cover to reach the second state of the rod.

Further the rod moves downward under decreasing pressure to drop from the second state and the washer moves downward away from the underside of the cover thereby unsealingly away from the underside of the cover to unseal the said hole on the cover and the rod dropping downwardly until rod head seated against the top surface of the cover to reset into the first state of the rod. The first state of the rod is indicative of zero internal pressure. The second state of the rod is indicative of operating internal pressure of the cooker. It also has a locking means of push rod type operably associated with the pressure monitoring means comprising of first end connected to the top end of the rod and the second end terminating near the peripheral edge of the cover and passing through a hole formed on the peripheral edge of the cover. It is arranged such that the second end of lock means is responsive and representative of the state of the rod with two positions which are extended state and retract state of the lock means corresponding to second state and first state of the rod of pressure monitoring means. Like in any conventional cooker a plurality of locking lugs on the base container associated with matching locking lugs on the cover but has one set of matching locking lugs of the container adapted to engage with the said locking means on the cover. For example, FIG. 2 shows a locking lug 10 on the container 8 engaged with the locking lug 12 of the cover 6.

The said arrangement is characterized in ordinarily securely locking the cover with the container when the said specific set of matching locking lug of the container is engaged with the said locking means and the internal pressure builds up a predetermined value and the locking rod is in extended state thereby becoming visible above the cover. Further it can ordinarily securely unlock the cover from the container when the internal pressure is released entirely and the locking rod is in retract state. It also ordinarily prevents pressure buildup if the said specific set of matching locking lug of the container is not engaged with the said locking means on the cover under partially closed condition the push rod of locking means is positioned against the lug of the container and is therefore prevented from engaging properly and hence prevents further pressure buildup. Further intentional manual downward push motion of the rod of the lock means will allow rapid release of the buildup pressure, which feature is desired very often by user.

In another aspect the invention relates to a pressure cooker with a Multifunction Safety lock means for securely locking the container with the cover prior to cooking and the said lock means which acts as a pressure indicator cum lock means with pressure response type body as described above.

In another aspect the cooker may be any conventional cooker.

In another aspect the cooker may be any cooker including pressure cooker.

In another aspect the cooker is a microwave cooker.

In another aspect the pressure monitoring means is removably mounted on the cover.

In another aspect the Multifunction Safety locking means is removably mounted.

The disclosure is with reference to drawings and illustrations but the scope of the invention covers all the modifications and variations known to the skilled person in the art.

The invention claimed is:

1. A multifunction safety lock means, which is a pressure indicator cam lock means for a pressure cooker, which lock means is a pressure response type body comprising:
   a. a pressure monitoring means comprising a moving rod that moves between a first state and a second state with a moveable sealing silicone washer mounted thereon and combinedly mounted freely across a hole formed on a cover of the cooker with the washer positioned underneath the cover, and which rod and washer move upward under increasing pressure to lift the rod from the first state and the washer towards an underside of the cover thereby pushing sealingly the washer until positioned against the underside of the cover to seal the hole, the rod also extending upwardly above a top surface of the cover to reach the second state of the rod and adapted further to move downward under decreasing pressure to drop the rod from the second state and the washer away from the underside of the cover thereby unsealingly moving the washer away from the underside of the cover to unseal the hole and the rod dropping downwardly until a rod head is seated against the top surface of the cover to reset into the first state of the rod, wherein the first state of the rod is indicative of zero internal pressure and the second state of the rod is indicative of an operating internal pressure of the cooker,
   b. a locking means of push rod type operably associated with the pressure monitoring means comprising a first end connected to a top end of the rod and a second end terminating near a peripheral edge of the cover and passing through a hole formed on the peripheral edge of the cover, such that the second end of lock means is responsive and representative of a state of the rod having two positions, which are an extended state and retracted state of the lock means corresponding to the second state and the first state of the rod of the pressure monitoring means,
   c. a plurality of locking lugs on a base container associated with matching locking lugs on the cooker cover, with a first set of matching locking lugs of the container adapted to engage with the locking means on the cover, and
   d. the arrangement characterized in that:
      (i) ordinarily securely locking the cooker cover with the container when the first set of matching locking lugs of the container is engaged with the locking means on the cover so that the internal pressure builds up beyond a predetermined value and the locking rod is in the extended state,
      (ii) ordinarily securely unlocking the cover from the container when the internal pressure is released entirely and the locking rod is in the retracted state,
      (iii) ordinarily preventing pressure buildup if the first set of matching locking lugs of the container is not engaged with the locking means on the cover, and
      (iv) an intentional manual downward push motion of the rod of the locking means releases the internal pressure rapidly.

2. The cooker as claimed in claim 1, wherein the cooker is a conventional pressure cooker operating on gas, microwave pressure cooker or an induction pressure cooker.

3. The cooker as claimed in claim 1, wherein the pressure monitoring means is removably mounted.

4. The cooker as claimed in claim 1, wherein the locking means is removably mounted.

5. A pressure cooker with a multifunction safety lock means for locking a container with a cover of the cooker, the lock means being a pressure indicator cam lock means with a pressure response type body, the pressure cooker comprising:
   a. a pressure monitoring means comprising a moving rod that moves between a first state and a second state with a sealing silicone washer mounted thereon and combinedly mounted freely across a hole formed on the cover of the cooker with the washer positioned underneath the cover, and which rod and washer move upward under increasing pressure to lift the rod from the first state and the washer towards an underside of the cover thereby pushing sealingly the washer until positioned against the underside of the cover to seal the hole, the rod also extending upwardly above a top surface of the cover to reach the second state of the rod and adapted further to move downward under decreasing pressure to drop the rod from the second state and the washer away from the underside of the cover thereby unsealingly moving the washer away from the underside of the cover to unseal the hole, the rod dropping downwardly until a rod head is seated against a top surface of the cover to reset into the first state of the rod, wherein the first state of the rod is indicative of zero internal pressure and the second state of the rod is indicative of an operating internal pressure of the cooker,
b. a locking means of a push rod type operably associated with the pressure monitoring means comprising a first end connected to a top end of the rod and a second end terminating near a peripheral edge of the cover and passing through a hole formed on the peripheral edge of the cooker cover, such that second end of locking means is responsive and representative of a state of the rod having two positions, which are an extended state and a retracted state of the locking means corresponding to the second state and the first state of the rod of the pressure monitoring means,
c. a plurality of locking lugs on a base container associated with matching locking lugs on the cooker cover, with a first set of matching locking lugs of the container adapted to engage with the locking means on the cover, and
d. the arrangement characterized in that:
  (i) ordinarily securely locking the cooker cover with the container when the first set of matching locking lugs of the container is engaged with the locking means on the cooker cover so that the internal pressure builds up beyond a predetermined value and the locking rod is in the extended state,
  (ii) ordinarily securely unlocking the cover from the container when the internal pressure is released entirely and the locking rod is in the retracted state,
  (iii) ordinarily preventing pressure buildup if the first set of matching locking lugs of the container is not engaged with the locking means on the cover, and
  (iv) an intentional manual downward push motion of the rod of the locking means releases the internal pressure rapidly.

6. The cooker as claimed in claim 5, wherein the cooker is a conventional pressure cooker operating on gas, microwave pressure cooker or an induction pressure cooker.

7. The cooker as claimed in claim 5, wherein the pressure monitoring means is removably mounted.

8. The cooker as claimed in claim 5, wherein the locking means is removably mounted.

* * * * *